(12) United States Patent
Pilli

(10) Patent No.: US 11,599,636 B1
(45) Date of Patent: Mar. 7, 2023

(54) SYSTEMS AND METHODS FOR MANAGING AND PROVIDING SOFTWARE PACKAGES WHICH HAVE UNDERGONE MALWARE AND/OR VULNERABILITY ANALYSIS

(71) Applicant: Aurora Security LLC, Tampa, FL (US)

(72) Inventor: Tulasi N M Pilli, Tampa, FL (US)

(73) Assignee: AURORA SECURITY LLC, Tampa, FL (US)

( * ) Notice: Subject to any disclaimer, the term of this patent is extended or adjusted under 35 U.S.C. 154(b) by 0 days.

(21) Appl. No.: 17/875,294

(22) Filed: Jul. 27, 2022

(51) Int. Cl.
*G06F 21/57* (2013.01)
*G06F 21/56* (2013.01)

(52) U.S. Cl.
CPC .......... *G06F 21/562* (2013.01); *G06F 21/577* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 8,769,690 B2* | 7/2014 | Ben-Itzhak | ......... | H04L 63/1441 709/224 |
| 2006/0031940 A1* | 2/2006 | Rozman | .................. | G06F 21/53 726/27 |
| 2010/0169972 A1* | 7/2010 | Kuo | ....................... | G06F 21/564 707/E17.001 |
| 2012/0159631 A1* | 6/2012 | Niemela | ............... | G06F 21/564 726/24 |
| 2014/0317752 A1* | 10/2014 | Maguire | ............. | H04L 63/1433 726/25 |
| 2020/0042712 A1* | 2/2020 | Foo | ....................... | G06F 16/9024 |
| 2020/0082094 A1* | 3/2020 | Mcallister | ................. | G06F 8/77 |

* cited by examiner

*Primary Examiner* — Fatoumata Traore

(74) *Attorney, Agent, or Firm* — Outlier Patent Attorneys, PLLC

(57) ABSTRACT

The present invention relates to systems and methods for providing and managing a repository of free and/or open source software (FOSS) which is free of malware and/or vulnerabilities. The invention comprises scanning FOSS with a malware scanner and adding the FOSS to an anti-malware package management system when the malware scanner indicates no malicious code and/or vulnerabilities have been detected. The anti-malware package management system is accessible by users as a trusted source to obtain FOSS which is free of malware and believed to be safe to use. The anti-malware package management system is updated over time to keep up with changing FOSS libraries and changing malware detection capabilities so that the anti-malware package management system remains a trusted source for users to obtain FOSS.

21 Claims, 8 Drawing Sheets

SYSTEMS AND METHODS FOR MANAGING AND PROVIDING SOFTWARE PACKAGES WHICH HAVE UNDERGONE MALWARE AND/OR VULNERABILITY ANALYSIS

BACKGROUND

Free and/or open source software (FOSS) is often used by developers to aid in developing larger software applications for various uses. Many developers may trust FOSS and/or use FOSS without analysis as to whether use of such software exposes their software application to potential malware and/or vulnerability issues. Currently, there is no known central source for obtaining FOSS which has been scanned for malware and/or vulnerabilities. Furthermore, as FOSS packages are updated and change over time via input from users, the security of such updates may change over time as well. Since anyone can contribute to FOSS libraries, there is potential for a user to add malicious code, yet many, if not all, FOSS sources fail to monitor FOSS libraries for malicious code. Again, users are left without certainty regarding the security of these changing software packages and there is currently no known system to continually evaluate the security of changing FOSS packages.

Moreover, as detection capabilities change (e.g. improved or updated malware scanners, etc.) packages which may have previously been considered safe and secure, may become vulnerable and/or corrupted. It can become overwhelming for a developer to ensure the FOSS packages they are using are clean and/or secure, between trying to keep up with the changes in FOSS packages and changes in malware and/or vulnerability detection. Furthermore, it is unlikely that a developer would discover any changes in malware and/or vulnerability status of FOSS packages they are using, without routine evaluation of FOSS packages being used by a developer which can be time consuming and unproductive.

SUMMARY

The present invention serves to provide increased confidence in using FOSS by allowing users to know that the FOSS they are downloading and employing is free from malware and/or vulnerabilities. This is accomplished by building a repository of anti-malware FOSS libraries by obtaining FOSS, scanning the FOSS to detect malware and/or vulnerabilities, storing the FOSS in accordance with the scan results, and providing users with the scan results. The present invention allows users to obtain software packages from a trusted, custom repository of software packages as opposed to downloading packages from unknown or untrusted sources across the internet which may not provide any malware/vulnerability analysis and/or protection. Furthermore, the present invention determines changes in one or both of software packages and malware/vulnerability detection approaches. When a new or altered software package or a new or altered detection approach is available, the present invention serves to update scans of the repository of software packages in order to ensure that FOSS remains safe to use. Moreover, when a software package is determined to be unsafe (e.g. due to malware and/or vulnerabilities) users may be notified, such as via direct communication, so that actions can be taken to reduce or eliminate the exposure to malware and/or vulnerabilities.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
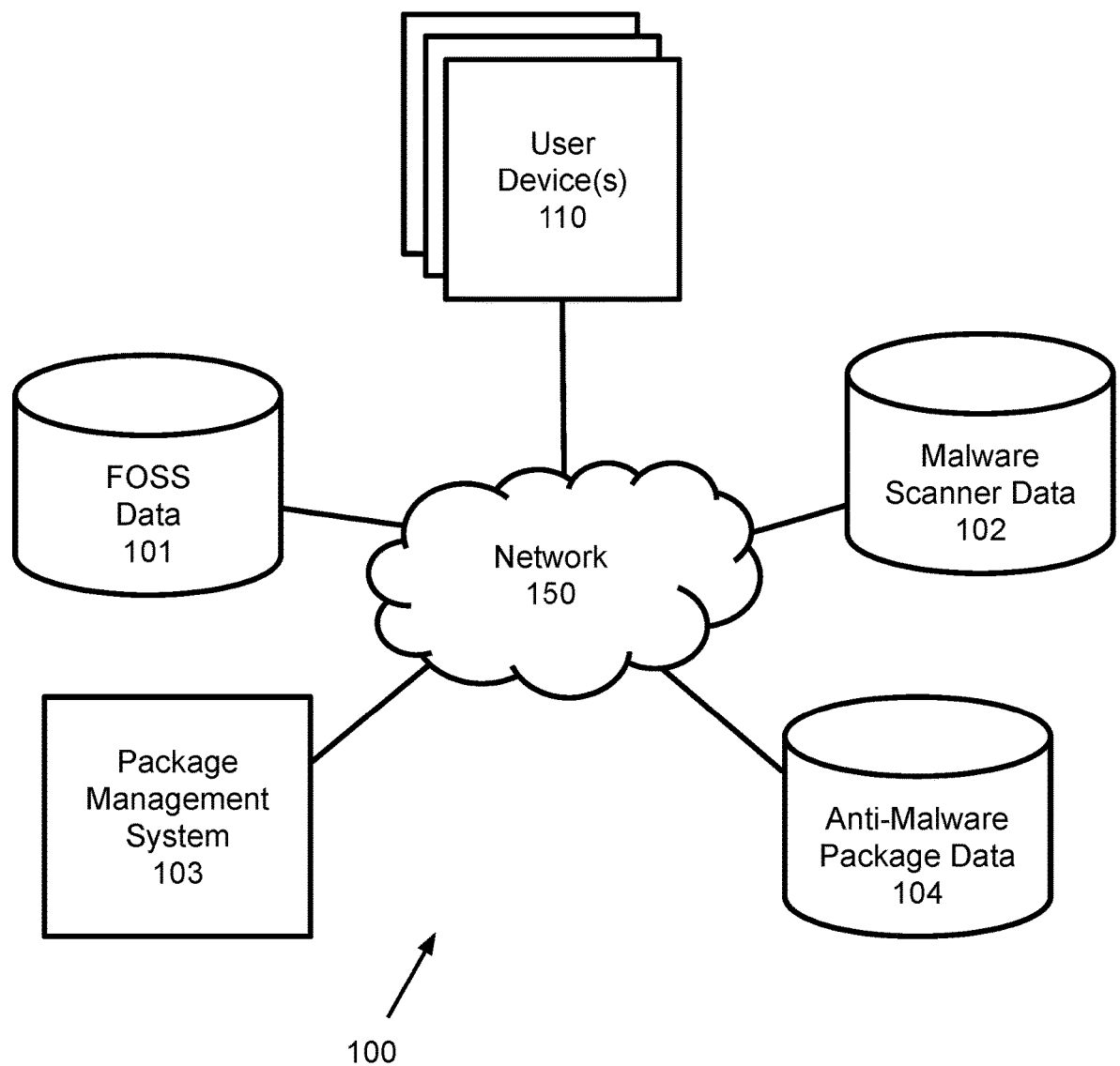
FIG. 1 illustrates a system for managing and providing anti-malware software packages in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates an exemplary embodiment of system 100 for managing and providing anti-malware software packages according to one embodiment. The system comprises user device(s) 110, Free and/or Open Source Software (FOSS) Data 101, malware scanner daa 102, package management system 103, anti-malware package data 104, and a network 150 over which the various components communicate and interact. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

FOSS data 101 comprises at least one free and/or open source software package. FOSS data 101 may comprise at least one datastore storing a plurality of software packages from different sources. FOSS data may comprise a plurality of datastores each associated with a different software source. FOSS data may comprise user provided software package(s). FOSS data 101 may be updated over time as new and/or updated software packages become available or are released. FOSS data 101 may comprise licensing information and/or terms of use information associated with software packages.

Malware scanner data 102 comprises data necessary to perform at least one of a malware scan and a vulnerability scan. Malware scanner data 102 may comprise at least one malware scanner operable to evaluate the presence of malware in software packages (e.g. software code). Malware scanner data 102 may comprise at least one scanner operable to evaluate the presence of vulnerabilities in software packages. Malware scanner data 102 may be updated over time as new and/or updated malware scanners become available or are released.

Package management system 103 obtains at least one of FOSS data, malware scanner data, anti-malware package data, and user input and processes the obtained data and/or input to at least one of scan software packages, store software packages based on scan results, and provide software packages to users. Package management system 103 may obtain at least one software package from FOSS data 101 and/or user device(s) 110 and perform at least one malware scan based on malware scanner data 102. In one aspect, the obtained at least one software package is scanned with a default malware scanner. In one aspect, the obtained at least one software package is scanned with a user specified malware scanner. Package management system 103 may periodically re-scan software packages, such as when new and/or updated malware scanners are available. In one aspect, package management system 103 evaluates licensing information and/or terms of use associated with each software package in order to provide users with up to date information regarding appropriate use of each software package.

Package management system 103 manages a database of anti-malware package data, such as anti-malware package data 104. Package management system 103 may store software packages based on the results of the malware scan. In one aspect, package management system 103 stores only packages having malware scans indicating no malware and/or no vulnerabilities. In one aspect, package management system stores packages having malware scans indicating no malware and/or no vulnerabilities in a first storage location (e.g. first datastore or database) and stores packages having malware scans indicating the presence of malware and/or vulnerabilities in a second storage location (e.g. second datastore or database). Package management system 103 may provide software packages to users in association with an API (application programming interface) call.

Package management system 103 may obtain software packages to be scanned on a periodic basis, such as checking for new software packages based on a scheduled timing (e.g. daily, weekly, monthly, etc.). Package management system 103 may obtain and scan software packages using a job scheduler, such as a cron job operation. Package management system 103 may obtain software packages upon obtaining an indication that a new or updated software package is available. For example, package management system 103 may employ an RSS (RDF Site Summary or Really Simple Syndication) feed in order to obtain indications of the availability of new or updated software packages.

In this way, package management system 103 serves as a custom repository of software packages and is operable to generate and/or provide a trusted source of malware-free and/or vulnerability-free FOSS packages for users to download and use as opposed to internet based sources which may offer little or no malware/vulnerability analysis and/or protection. Package management system 103 may notify users of discovered malware and/or vulnerabilities associated with software packages downloaded by or in use by a user. Package management system 103 may notify users of the availability of new or updated software packages. Ultimately, package management system 103 is operable to provide users with a trusted source of software packages to use in keeping their applications up to date and without any known malware and/or vulnerability issues. Package management system 103 removes the burden of checking for malware and/or vulnerabilities so that users can place more focus on their own software development and use FOSS packages with reduced fear of a malware and/or vulnerability issue.

Anti-malware package data 104 comprises at least one software package which has been scanned for at least one of malware and vulnerabilities. Anti-malware package data 104 may comprise one or more datastores and/or databases of software packages and associated malware and/or vulnerability information. Anti-malware package data 104 may be a separate component (as depicted) or may be incorporated into package management system 103. Anti-malware package data 104 may comprise a plurality of datastores and/or databases storing software packages based on at least one of malware and/or vulnerability scan results and software package version history.

User device(s) 110 include, generally, a computer or computing device including functionality for communicating (e.g., remotely) over a network 150. Data may be collected from user devices 110, and data requests may be initiated from each user device 110. User device(s) may provide at least one of requests for download of software packagesUser device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2:
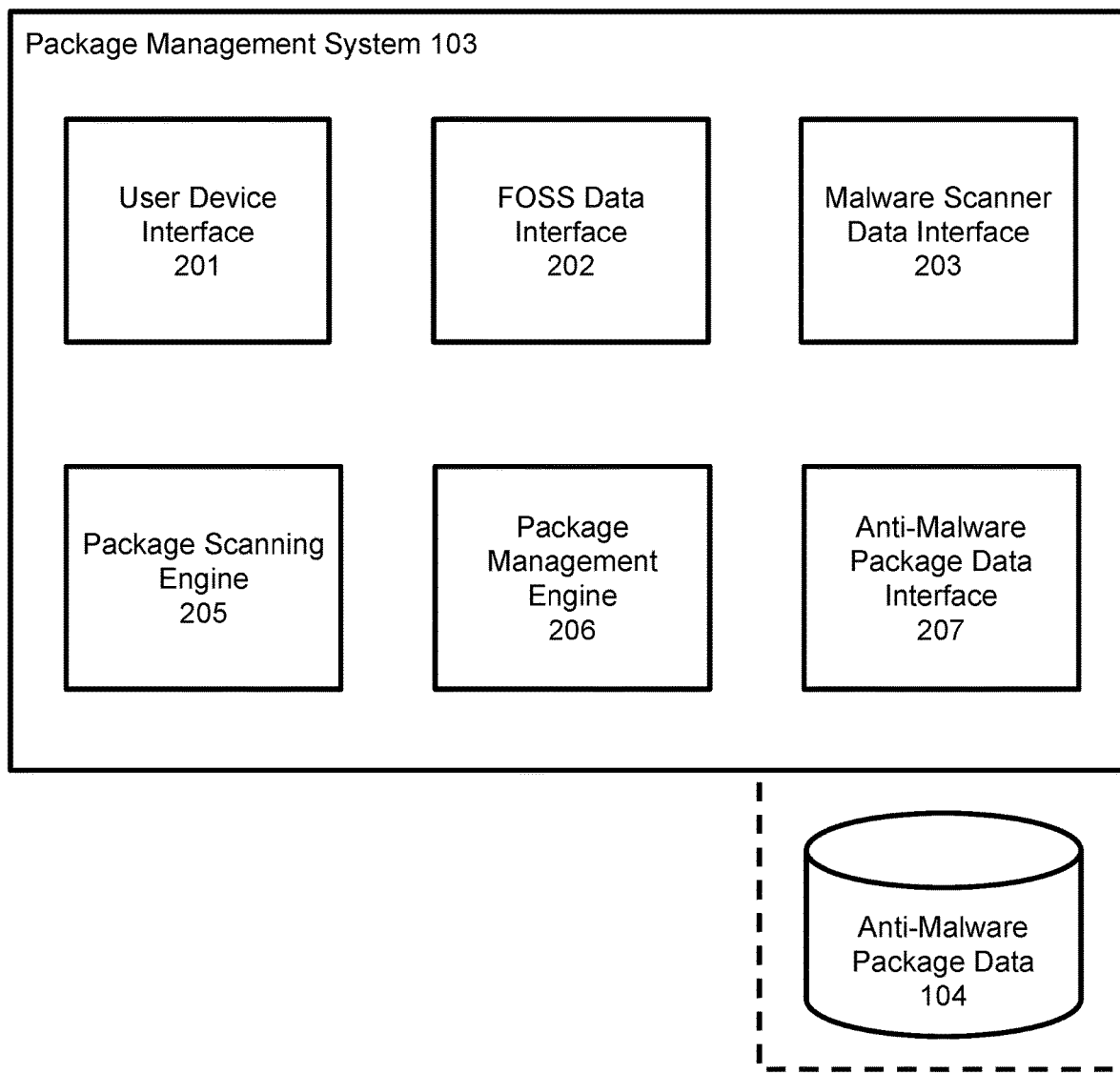
FIG. 2 illustrates a package management system in accordance with an exemplary embodiment of the present invention.

FIG. 2 illustrates an exemplary embodiment of the package management system 103. The package management system 103 comprises user input interface 201, FOSS data interface 202, malware scanner data interface 203, package scanning engine 205, package management engine 206, anti-malware package data interface 207, and optionally anti-malware package data 104. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

User device interface 201 is operable to communicate with user devices in association with FOSS packages and associated malware and/or vulnerability information. User device interface 201 may obtain at least one request for a FOSS package to be downloaded. User device interface 201 may obtain at least one software package from a user (e.g. uploaded by the user) to be scanned by a malware scanner. User device interface 201 may obtain custom scan requirements associated with a user. In one aspect, custom scan requirements may comprise a specified malware scanner to be used. In one aspect, custom scan requirements may comprise an indication that no particular malware scanner is required by the user (e.g. a default malware scanner is acceptable, any malware scanner is acceptable, etc.). In one aspect, user device interface 201 obtains a download request for a FOSS package selected from a list of available software packages, such as packages which have been previously scanned and/or stored in anti-malware data 104. In one aspect, user device interface 201 obtains a download request for a FOSS package which has not been previously scanned and/or stored in anti-malware data 104.

FOSS data interface 202 is operable to obtain at least one FOSS package periodically and/or on-demand (e.g. upon request by a user for a package which has not been previously obtained). In one aspect, FOSS data interface 202 obtains software packages in association with a job scheduler, such as a cron job operation. In one aspect, FOSS data interface 202 obtains software packages in association with at least one RSS feed, such as RSS feeds indicating the availability of a new or updated package. In one aspect, FOSS data interface 202 obtains FOSS packages from external sources such as public databases. In one aspect, FOSS data interface 202 obtains FOSS packages from anti-malware data 104 such as in circumstances when a re-scan is going to be performed on the package.

Malware scanner data interface 203 is operable to obtain malware scanner data and/or vulnerability scanner data for use in scanning at least one software package. Alternatively, malware scanner data interface 203 may be operable to provide at least one software package to an external malware and/or vulnerability scanner and in turn obtain a scan result. Malware scanner data interface 203 may periodically obtain at least one of new (or updated) scanner data and new (or updated) scan results. In one aspect, periodically obtaining scanner data comprises obtaining scanner data at scheduled intervals (e.g. daily, weekly, monthly, etc.). In one aspect, periodically obtaining scanner data comprises obtaining scanner data at specific time points such as upon release of new or updated malware scanners.

Package scanning engine 205 is operable to at least one of perform a scan of at least one software package for malware and/or vulnerabilities, and assign a scan result to the scanned package (e.g. flag as at least one of malware detected, vulnerability detected, clean, etc.). Package scanning engine 205 may perform scans in association with a job scheduler (e.g. cron job operation) in order to routinely scan obtained software packages at specified time intervals. Package scanning engine 205 may assign a scan result to each scanned software package based on whether any malware and/or vulnerabilities are detected. In one aspect, package scanning engine 205 is operable to perform on-demand scans. For example, upon obtaining a user request to download a software package where the user request is associated with custom scan requirements (e.g. a specified malware scanner to be used), package scanning engine 205 may perform an on-demand scan based on the custom scan requirements. The on-demand scan based on the custom scan requirements may be in place of or in addition to a scheduled (or previously conducted) scan using a different scanner (e.g. a default scanner). In circumstances where the scan results of a custom scan differ from that of another scanner (e.g. a default scanner), package scanning engine 205 may assign a new scan result to the software package by changing a previous scan result assignment (e.g. from clean to vulnerable/malware detected, from vulnerable/malware to clean). In one aspect, the package scanning engine 205 may assign the different scan result in addition to the previous scan result so that users can be provided with an indication of the conflicting scan results.

Package management engine 206 is operable to determine how to handle packages based on a scan result (e.g. from package scanning engine 205 and/or malware scanner data interface 203). Package management engine 206 may assign software packages to at least one datastore and/or database based on the scan result. In one aspect, package management engine 206 assigns software packages to a first datastore and/or database if the scan result indicates the package is clean (i.e. no malware/vulnerability detected). In this way, a datastore and/or database of scanned, verified software packages can be maintained for providing such packages to users. In one aspect, package management engine 206 assigns software packages to a second datastore and/or database if the scan result indicates the package is unsafe or potentially unsafe (e.g. malware/vulnerability detected). In one aspect, package management engine 206 discards or otherwise does not assign a package to a datastore and/or database if the scan result indicates a detection of malware and/or vulnerability. In other words, unless a software package is found to be clean (free from known vulnerabilities and/or malware), the software package is not stored for later download by users. In this circumstance, the results of the scan may be stored so that users can be provided with such information (e.g. upon user request of such a package, presenting packages in association with their scan result status, etc.). In one aspect, package management engine 206 assigns software packages to at least one datastore and/or database in association with their scan result. For example, all software packages may be stored in the same datastore and/or database regardless of scan result status, however the software packages are stored in association with an indication of the scan result.

Package management engine 206 is operable to switch assignment from one storage location to another if a scan result changes over time (e.g. due to custom scan request, due to updated scanner data/result, release of new or updated package, etc.). Package management engine 206 may notify users, in real-time, in association with at least one of a change in scan result, a change in assignment of a software package to a datastore and/or database, availability of a new or updated software package. In one aspect, package management engine 206 may notify users of the above exemplary changes, only if the change is associated with a package the user has previously downloaded. In one aspect, although users are notified of changes, not all users may want to alter their use of a software package as a result of the change. In these circumstances, package management engine 206 may assign software packages to an additional datastore and/or database (e.g. for older versions of at least one software package) in case users prefer to continue using a prior version. In this way, the datastore and/or database of clean software packages can be maintained distinct from software packages which have not been verified as clean. In one aspect, package management engine 206 may generate a scan history associated with each package using scan results obtained over time.

Anti-malware package data interface 207 is operable to provide software package data to at least one of user device(s) (e.g. user device(s) 110), and a datastore and/or database (e.g. anti-malware package data 104). In one aspect, upon receipt of a request from a user to download a software package, anti-malware package data interface 207 may provide a scanned software package to the user. In one aspect, anti-malware package data interface 207 may provide a software package only if the scan results indicate no detected malware and/or vulnerabilities. In one aspect, anti-malware package data interface 207 may provide software package data along with an indication of the scan results and leave the decision up to the user as to whether to proceed with downloading the software package. Anti-malware package data interface 207 may provide software packages via an application programming interface (API). Anti-malware package data interface 207 may provide software packages to appropriate datastores and/or databases based on at least one of the scan results and assignment information as determined by the package management engine 206.

Anti-malware package data 104, as discussed above with respect to FIG. 1, may take the form of at least one datastore and/or database which may be incorporated into the package management system 103, may stand-alone, or be part of another system. Anti-malware package data 104 comprises at least one software package which has been evaluated for the presence of malware and/or vulnerabilities. In one aspect, anti-malware package data 104 comprises software packages that have been scanned by a default scanner. In one aspect, anti-malware package data 104 comprises software packages that have been scanned as part of updates to at least one of scanner data and software packages. In one aspect, anti-malware package data 104 comprises software packages that have been scanned or re-scanned in association with custom scans requirements based on user preferences/requests. In one aspect, anti-malware package data 104 comprises data associated with scan results (e.g. a scan history) associated with each software package.

Figure 3A:
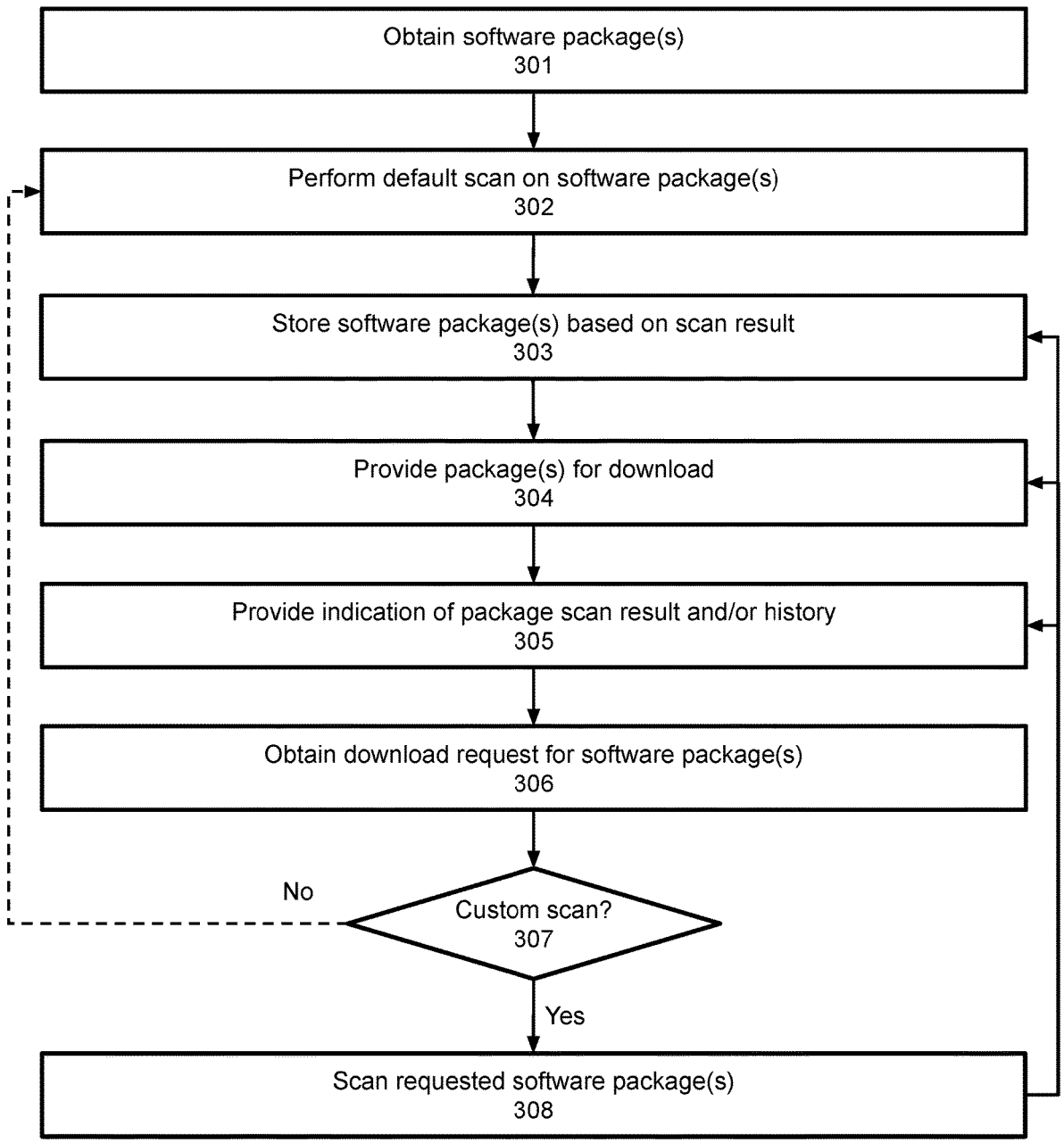
FIG. 3A illustrates an exemplary process for managing a repository of FOSS packages in accordance with malware and/or vulnerability scan results according to one embodiment of the invention.

FIG. 3A illustrates an exemplary process for managing a repository of FOSS packages which have been scanned for malware and/or vulnerabilities and providing FOSS packages to users in accordance with an exemplary embodiment of the invention. The process comprises obtaining at least one software package 301, performing a default scan of the at least one software package 302, storing the at least one software package based on the scan result 303, providing the at least one package for download 304, providing an indication of package scan result and/or scan history 305, obtaining a download request for at least one software package 306, determining custom scan requirements 307, and performing a custom scan in accordance with user requirements 308. The process may comprise additional steps, fewer steps, and/or a different order of steps without departing from the scope of the invention as would be apparent to one of ordinary skill in the art.

At step 301, the process may comprise obtaining at least one software package. The at least one software package may be obtained from a FOSS data source including, but not limited to, a FOSS database, publisher of a software package(s), user provided software package, etc. The obtaining of software packages may be performed prior to making packages available for download and/or prior to obtaining a request for a software package. The obtaining of software packages may be performed in response to obtaining a request for a software package, such as in circumstances where the requested software package has not previously been obtained, scanned, and/or stored as part of the ongoing repository management process.

At step 302, the process may comprise performing a default scan on the least one software package. Any malware and/or vulnerability scanning approach may be used as part of the default scan. The default scan may be performed in association with obtained malware scanner data. The default scan may be updated (i.e. re-performed) over time in association with at least one of new or updated scanner data and updated software package(s).

At step 303, the process may comprise storing the at least one software package based on the scan result. In one aspect, storing may comprise at least one of storing software packages having a scan result indicating no malware and/or vulnerabilities in a first location (e.g. first database) and storing software packages having a scan result indicating the presence of malware and/or vulnerabilities in a second location (e.g. second database). In one aspect, storing comprises storing only packages having a scan result indicating no malware and/or vulnerabilities (i.e. software packages having a scan result indicating the presence of malware and/or vulnerabilities are not stored). In one aspect, storing comprises storing a scan result associated with each scanned software package.

At step 304, the process may comprise providing the at least one package for download. In one aspect, providing comprises making the at least one software package available to be downloaded, such as through an API call. In one aspect, the providing comprises providing a list of software packages and their associated scan results/history. In one aspect, the providing comprises providing only packages associated with scan results indicating that no malware and/or vulnerabilities were detected in the software package. In one aspect, the providing comprises providing a list of software packages and a list of available malware scanners which can be used to scan a software package selected from the list prior to initiating a download by the user.

At step 305, the process may comprise providing an indication of each package scan result and/or scan history. For example, providing may comprise providing an indication of at least one of the last scan performed, the scan result, the scanner used, and a history of all scans performed, all scan results and all scanners used. In one aspect, providing an indication of the scan result comprises providing an indication of a custom scan result. In one aspect, providing may comprise prompting a user to confirm that they acknowledge the scan result prior to proceeding to a download of the software package.

At step 306, the process may comprise obtaining a download request for at least one software package. The obtaining may comprise obtaining a selection of at least one software package from a list of packages provided to the user. The obtaining may comprise identification of a software package to be downloaded, such as by the user entering the name of a software package desired. In one aspect, obtaining the download request may comprise at least one of obtaining a link to the software package (e.g. as provided by a user) and obtaining the software package directly from the user (e.g. user uploading the software package) (under this latter option the download request may be considered more of a scan request since the package has already been downloaded by the user).

At step 307, the process may comprise determining custom scan requirements. Determining custom scan requirements may comprise evaluating user input to determine whether the user has specified a particular malware scanner to be used in scanning the software package(s). If the user does not specify the need for a custom scan then it may be determined that any scan (e.g. a default scan) is satisfactory and no custom scan is needed. In circumstances where the download request is associated with a software package that has not been previously obtained and/or scanned and when no custom scan is required as determined from user specified custom scan requirements, the process may return to step 302 in order to perform a scan of the software package using the default scanner to determine whether any malware and/or vulnerabilities are detected.

At step 308, the process may comprise performing a custom scan in accordance with user requirements. When it is determined that a custom scanner has been specified by the user, a custom scan is performed using the specified scanner. In one aspect this comprises obtaining the specified scanner from a scanner source such as malware scanner data 102 as in FIG. 1 above. After performing a custom scan, the process may return to at least one of steps 303, 304 and 305 based on the results of the scan. In one aspect, the process may return to step 303 in order to store a software package based on the scan results. This storing may be done as discussed in FIG. 2 above wherein the scan results are used to determine an appropriate storage location (e.g. datastore or database) for the software package and update the storage location accordingly. In one aspect, the process may return to step 304 in order to make the package available for download. For example, if a new package was requested which was not previously scanned/available, the custom scan may result in a change associated with the availability of packages for download (e.g if no malware and/or vulnerabilities were detected in the new package). In one aspect, the process may return to step 305 in order to provide an updated indication of the scan result and/or scan history as a result of the custom scan.

Figure 3B:
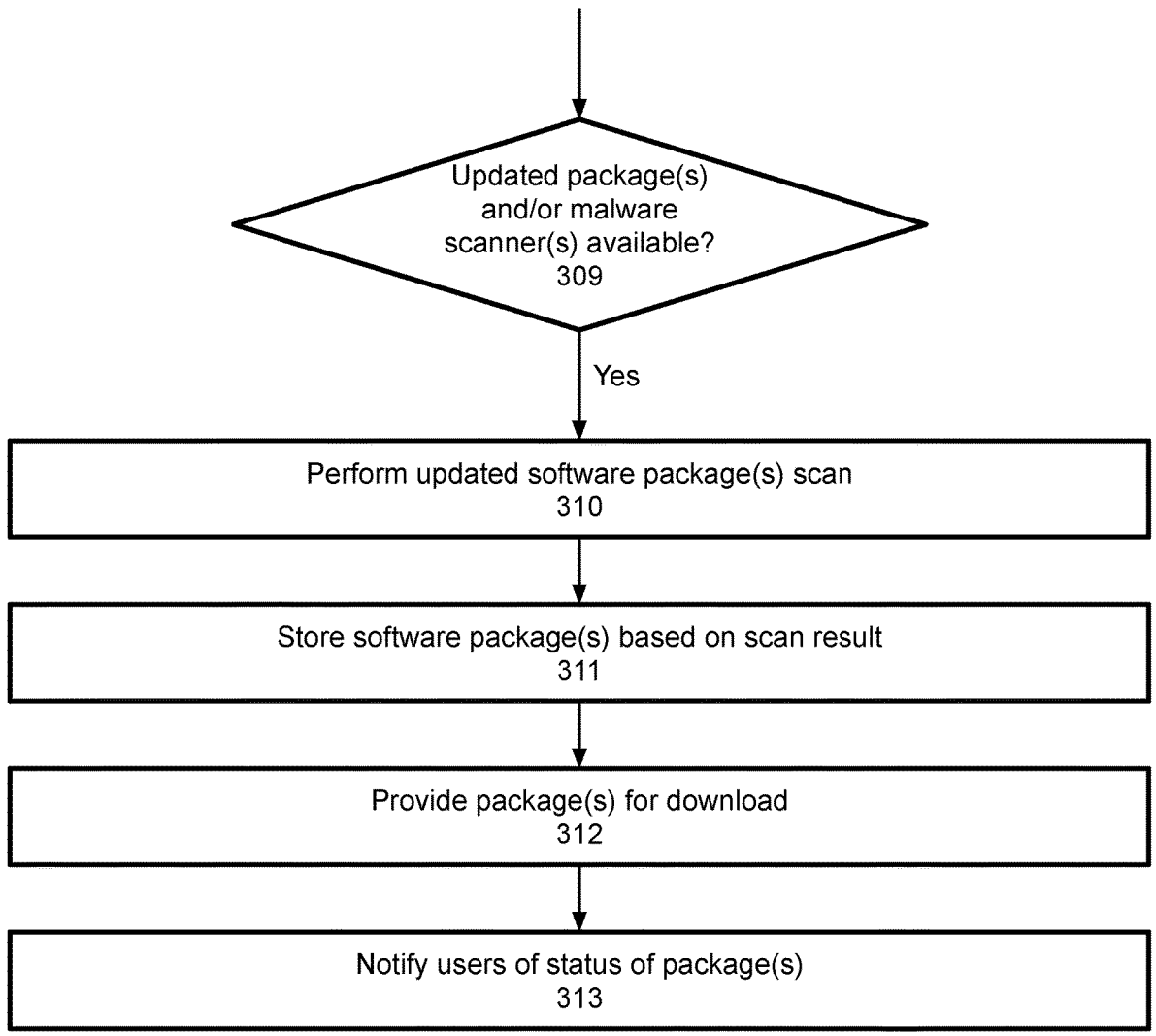
FIG. 3B illustrates an exemplary process for managing and updating a repository of FOSS packages in accordance with malware and/or vulnerability scan results according to one embodiment of the invention.

FIG. 3B illustrates an exemplary process for managing and updating a repository of FOSS packages in accordance with an exemplary embodiment of the invention. In general, this process may occur over time (e.g. after a repository has been established) as new or updated software packages and/or malware scanners become available. The process comprises determining if updated software packages and/or malware scanners are available 309, performing an updated scan of at least one software package 310, storing the at least one software package based on the updated scan results 311, providing the at least one software package for download 312, notifying users of package status associated with scanning 313. The process may comprise additional steps, fewer steps, and/or a different order of steps without departing from the scope of the invention as would be apparent to one of ordinary skill in the art.

At step 309, the process may comprise determining at least one of whether a new or updated software package is available and whether a new or updated malware scanner (or associated scanner data) is available. Determining may comprise obtaining at least one RSS feed indicating the availability of a new or updated software package and/or malware scanner. Determining may comprise use of a job scheduler (e.g. cron job operation) to periodically check for at least one new or updated software package and/or malware scanner.

At step 310, the process may comprise performing an updated scan of at least one software package based on the determination made at step 309. In one aspect, when a new or updated malware scanner (or associated malware scan data) is determined to be available, at least one software package (e.g. a previously scanned and/or stored software package, a newly obtained software package, etc.) may be scanned (or undergo an updated scan process) using the new or updated malware scanner to identify the presence of any known malware and/or vulnerabilities. In one aspect, when a new or updated software package is determined to be available, the new or updated software package may be scanned using any malware scanner (e.g. a default malware scanner, a newly updated malware scanner, etc.).

At step 311, the process may comprise storing the software package(s) based on the scan result. For example, if the scan result of a new or updated malware scan on a previously scanned software package maintains an indication that no malware and/or vulnerabilities were detected in the software package, the storing of the software package may remain unchanged (e.g. the package remains stored in the same location such as a first database). If the scan result of a new or updated malware scan on a previously scanned software package changes from an indication of no malware and/or vulnerabilities detected to a result indicating malware and/or vulnerabilities detected, the storing of the software package may change (e.g. the software package may be moved from a first location to a second location such as from a first database to a second database). In one aspect, when the scan results associated with scanning an updated software package indicate no malware and/or vulnerabilities detected, storing may comprise storing the updated software package in a first location such as a first database. In one aspect, this may be in addition to the previous version of the updated software package. Alternatively, the updated software package may replace the previous version of the software package and the previous version may be removed from the first database and either discarded or stored in a second location. When the scan results associated with scanning an updated software package indicate the presence of malware and/or vulnerabilities, the storing may comprise maintaining storage of the previous version of the software package in a first location (e.g. first database). In this scenario, the updated version of the software package which cannot be considered clean, may be discarded or stored in a second location (e.g. second database). In one aspect, storing may comprise updating a stored scan history associated with each software package to reflect the results of the updated or new scan.

At step 312, the process may comprise providing at least one software package for download. This providing may comprise the same providing as previously described above including, but not limited to, making software package(s) available for download, providing a list of available software packages, providing scan results and/or scan history for software package(s), etc.

At step 313, the process may comprise notifying users of the malware and/or vulnerability status of software packages. In one aspect, notifying comprises making the most up to date scan results available to at least one user in real-time. In one aspect, this comprises notifying users regarding only software packages which they have previously requested and/or downloaded. In one aspect, notifying comprises transmitting a notification (e.g. a message) to a user regarding a change in the malware and/or vulnerability status of software packages they have previously requested and/or downloaded. In one aspect, notifying comprises prompting a user to acknowledge the malware and/or vulnerability status of software packages, such as prompting a user to acknowledge they have downloaded (or are attempting to download) a software package which has been determined to have detected malware and/or vulnerability. In one aspect, notifying comprises prompting a user to download an updated version of a software package they have previously requested and/or downloaded.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components or the like may be and/or comprise hardware and/or software as described herein. For example, the package management system 103 and subcomponents thereof may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
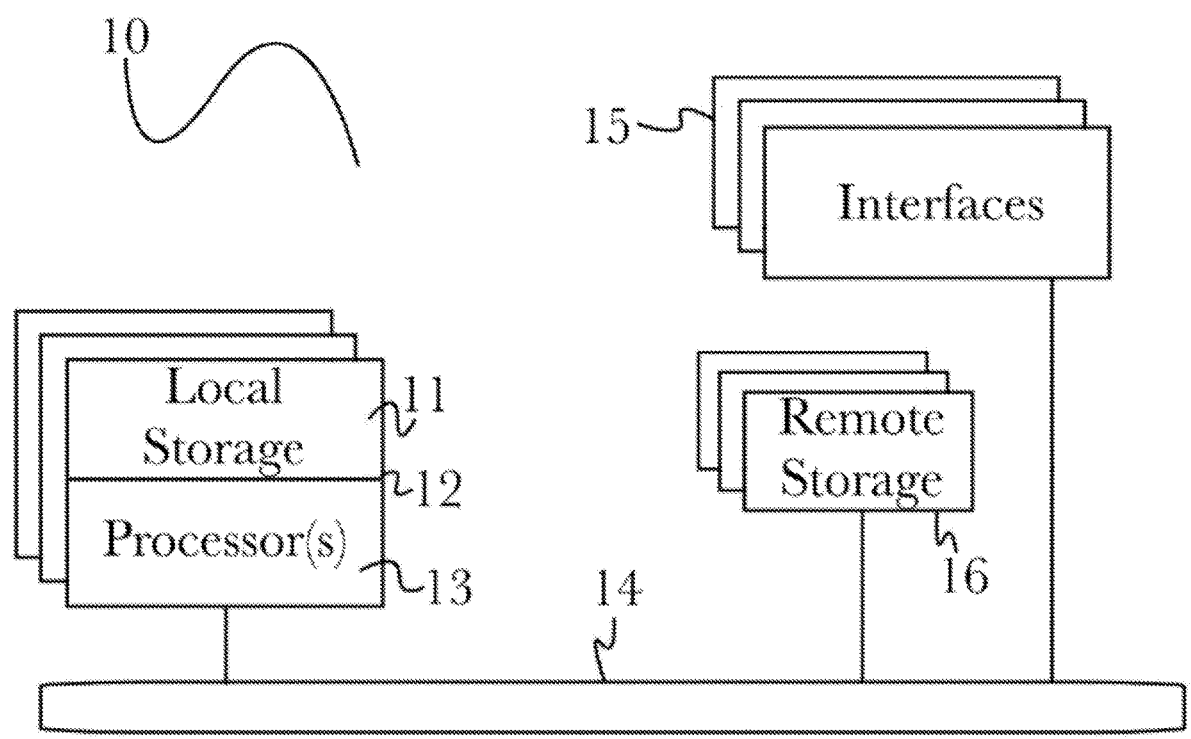
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
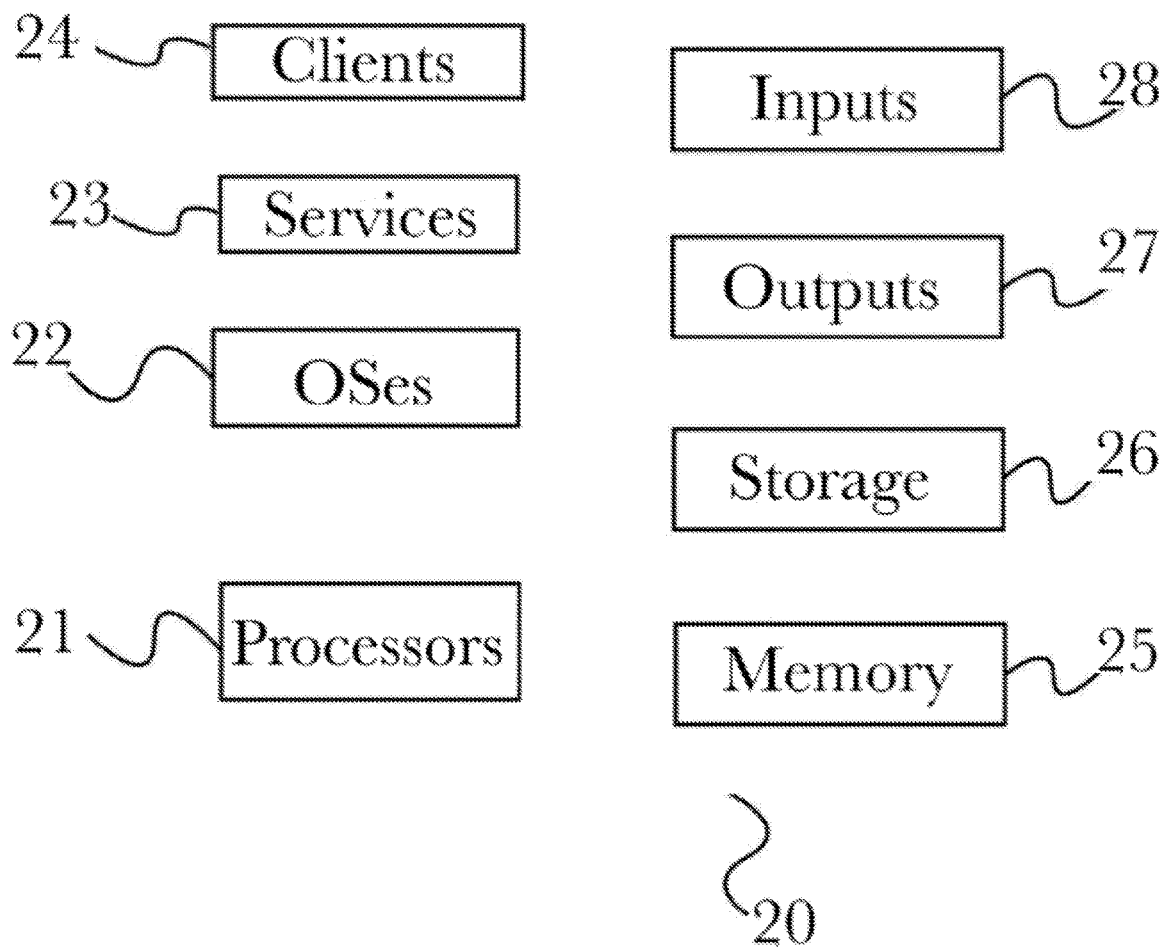
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
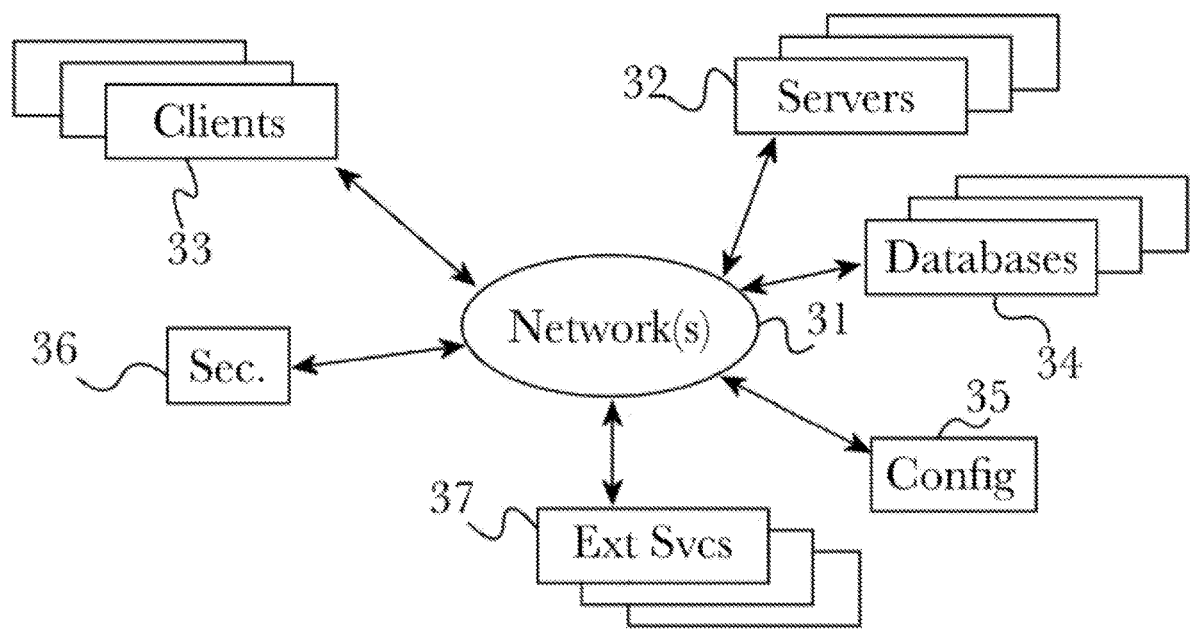
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
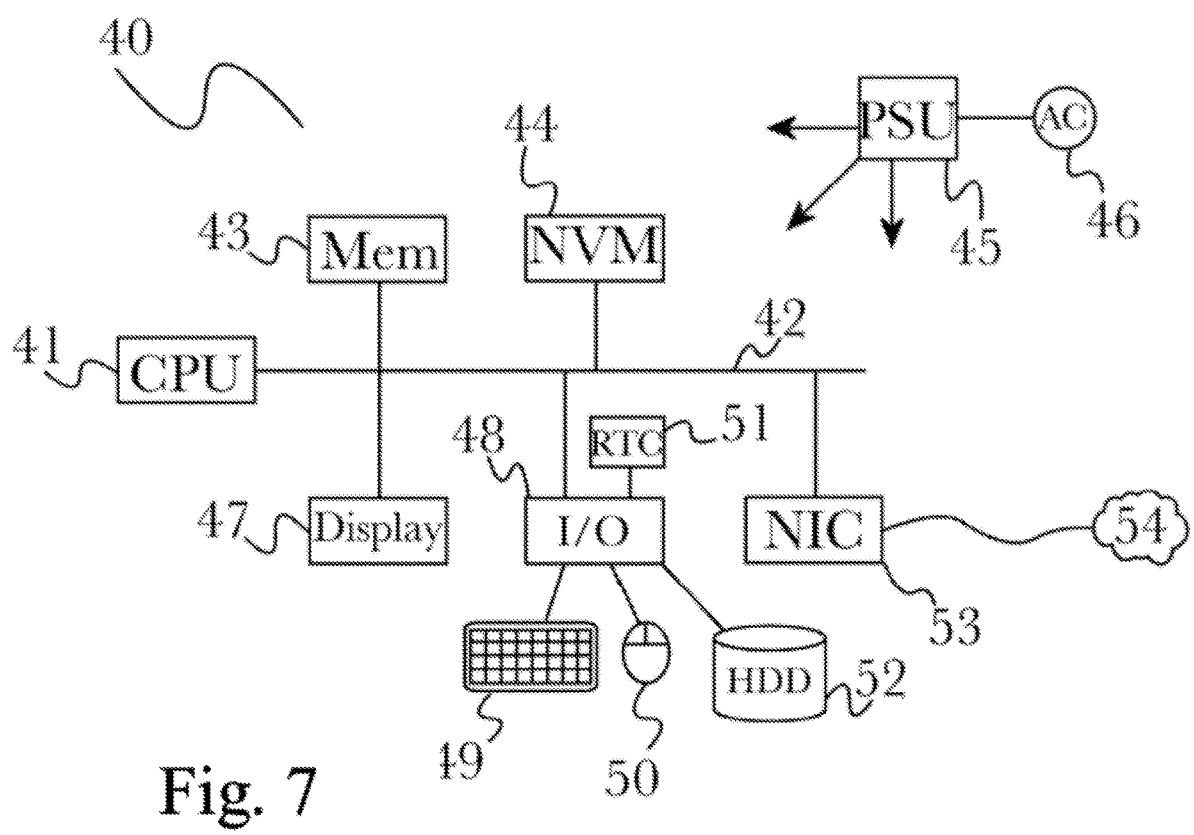
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for anti-malware package management, the computer implemented method comprising:
obtaining at least one software package, the at least one software package associated with at least one of free software and open source software;
performing a first malware scan on the at least one software package, the first malware scan associated with a first malware scanner and providing a first scan result;

storing the at least one software package in a first database on a first server or a second database on the first server based on the first scan result;

obtaining a download request requesting at least one software package, the download request associated with a requester, the download request requesting at least one of a software package stored in the first database, a software package stored in the second database, and a software package not stored in the first database or second database;

obtaining custom scan requirements based on presets associated with the requester;

performing, based on the custom scan requirements, a second malware scan on the at least one requested software package when the download request is associated with a software package stored in the first database or second database, the second malware scan associated with a second malware scanner and providing a second scan result;

assigning the at least one software package stored in the first database or second database to at least one of the first database and the second database based on the second scan result;

obtaining the at least one software package not stored in the first database or second database when the download request is associated with a software package not stored in the first database or second database;

performing at least one of a first malware scan and a second malware scan, based on the custom scan requirements, on the at least one requested software package not stored in the first or second database, the first malware scan associated with a first malware scanner and providing a first scan result for the at least one requested software package not stored in the first or second database, the second malware scan associated with a second malware scanner and providing a second scan result for the at least one requested software package not stored in the first or second database;

assigning the at least one software package not stored in the first database or second database to at least one of the first database and the second database based on at least one of the first and second scan result for the at least one requested software package not stored in the first or second database;

making the at least one software package available for download from the first server via an application programming interface (API) call in response to the download request; and providing a notification to the requester regarding at least one of the first scan result, second scan result, and a scan history associated with the requested software package.

2. The computer implemented method according to claim 1, the first database representing a repository of software packages having no identified malware and/or vulnerabilities, the second database representing a repository of software packages having identified malware and/or vulnerabilities.

3. The computer implemented method according to claim 1, wherein storing comprises storing the at least one software package in the first database if the first scan result indicates no malware and/or vulnerabilities present and storing the at least one software packing in the second database if the first scan result indicates a presence of malware and/or vulnerabilities.

4. The computer implemented method according to claim 1, wherein assigning comprises at least one of moving the at least one software package from the first database to the second database and leaving the at least one software package in the first database or second database.

5. The computer implemented method according to claim 1, further comprising:

obtaining at least one updated software package, the at least one updated software package comprising an update associated with at least one previously obtained software package stored in at least one of the first database and second database; and performing at least one of a first malware scan and a second malware scan on the at least one updated software package, the first malware scan associated with the first malware scanner and providing a first updated scan result, the second malware scan associated with the second malware scanner and providing a second updated scan result.

6. The computer implemented method according to claim 5, wherein the obtaining at least one updated software package and performing at least one of a first malware scan and a second malware scan on the at least one updated software package are performed in association with a job executed in association with a job scheduler.

7. The computer implemented method according to claim 5, further comprising:

assigning the at least one updated software package to the first database or the second database based on at least one of the first updated scan result and second updated scan result.

8. The computer implemented method according to claim 7, wherein the at least one updated software package is assigned to the first database when at least one of the first updated scan result and second updated scan result indicate no malware and/or vulnerabilities present, and wherein the at least one updated software package is assigned to the second database when at least one of the first updated scan result and second updated scan result indicate a presence of malware and/or vulnerabilities.

9. The computer implemented method according to claim 5, further comprising:

assigning the at least one previously obtained software package to the first database or the second database based on at least one of the first updated scan result and second updated scan result.

10. The computer implemented method according to claim 9, wherein the at least one previously obtained software package is assigned to the first database when at least one of the first updated scan result and second updated scan result indicate a presence of malware and/or vulnerabilities, and wherein the at least one previously obtained software package is assigned to the second database when at least one of the first scan result and second scan result indicate no malware and/or vulnerabilities present.

11. The computer implemented method according to claim 5, further comprising notifying the requester of at least one of the availability of the at least one updated software package and a scan history associated with the at least one updated software package.

12. The computer implemented method according to claim 5, the obtaining at least one updated software package performed in response to obtaining an indication associated with an availability of an update to the at least one previously obtained software package, the indication comprising a Really Simple Syndication (RSS) feed.

13. The computer implemented method according to claim 1, wherein the presets associated with the requester comprise at least one of an indication to use a specified malware scanner and an indication that no specific malware scanner is necessary, wherein performing the second malware scan is only performed when the presets associated with the requester comprise a specified malware scanner which is different than the first malware scanner associated with the first malware scan.

14. The computer implemented method according to claim 1, wherein the first malware scan is associated with a first malware scanner that is different than a second malware scanner associated with the second malware scan.

15. The computer implemented method according to claim 1, wherein obtaining a download request comprises providing a list of previously scanned software packages and obtaining a selection of at least one software package selected from the list.

16. The computer implemented method according to claim 1, further comprising obtaining updated malware scanner information and, in response, performing an updated malware scan.

17. A computing system for anti-malware package management, the computing system comprising:
   at least one computing processor; and
   memory comprising instructions that, when executed by the at least one computing processor, enable the computing system to:
   obtain at least one software package, the at least one software package associated with at least one of free software and open source software;
   perform a first malware scan on the at least one software package, the first malware scan associated with a first malware scanner and providing a first scan result;
   store the at least one software package in a first database on a first server or a second database on the first server based on the first scan result;
   obtain a download request requesting at least one software package, the download request associated with a requester, the download request requesting at least one of a software package stored in the first database, a software package stored in the second database, and a software package not stored in the first database or second database;
   obtain custom scan requirements based on presets associated with the requester;
   perform, based on the custom scan requirements, a second malware scan on the at least one requested software package when the download request is associated with a software package stored in the first database or second database, the second malware scan associated with a second malware scanner and providing a second scan result;
   assign the at least one software package stored in the first database or second database to at least one of the first database and the second database based on the second scan result;
   obtain the at least one software package not stored in the first database or second database when the download request is associated with a software package not stored in the first database or second database;
   perform at least one of a first malware scan and a second malware scan, based on the custom scan requirements, on the at least one requested software package not stored in the first or second database, the first malware scan associated with a first malware scanner and providing a first scan result for the at least one requested software package not stored in the first or second database, the second malware scan associated with a second malware scanner and providing a second scan result for the at least one requested software package not stored in the first or second database;
   assign the at least one software package not stored in the first database or second database to at least one of the first database and the second database based on at least one of the first and second scan result for the at least one requested software package not stored in the first or second database;
   make the at least one software package available for download from the first server via an application programming interface (API) call in response to the download request; and
   provide a notification to the requester regarding at least one of the first scan result, second scan result, and a scan history associated with the requested software package.

18. A non-transitory computer readable medium comprising instructions that when executed by a processor enable the processor to:
   obtain at least one software package, the at least one software package associated with at least one of free software and open source software;
   perform a first malware scan on the at least one software package, the first malware scan associated with a first malware scanner and providing a first scan result;
   store the at least one software package in a first database on a first server or a second database on the first server based on the first scan result;
   obtain a download request requesting at least one software package, the download request associated with a requester, the download request requesting at least one of a software package stored in the first database, a software package stored in the second database, and a software package not stored in the first database or second database;
   obtain custom scan requirements based on presets associated with the requester;
   perform, based on the custom scan requirements, a second malware scan on the at least one requested software package when the download request is associated with a software package stored in the first database or second database, the second malware scan associated with a second malware scanner and providing a second scan result;
   assign the at least one software package stored in the first database or second database to at least one of the first database and the second database based on the second scan result;
   obtain the at least one software package not stored in the first database or second database when the download request is associated with a software package not stored in the first database or second database;
   perform at least one of a first malware scan and a second malware scan, based on the custom scan requirements, on the at least one requested software package not stored in the first or second database, the first malware scan associated with a first malware scanner and providing a first scan result for the at least one requested software package not stored in the first or second database, the second malware scan associated with a second malware scanner and providing a second scan result for the at least one requested software package not stored in the first or second database;
   assign the at least one software package not stored in the first database or second database to at least one of the first database and the second database based on at least one of the first and second scan result for the at least one requested software package not stored in the first or second database;
make the at least one software package available for download from the first server via an application programming interface (API) call in response to the download request; and
provide a notification to the requester regarding at least one of the first scan result, second scan result, and a scan history associated with the requested software package.

19. A computer implemented method for anti-malware package management, the computer implemented method comprising:
obtaining at least one software package, the at least one software package associated with at least one of free software and open source software;
performing a first malware scan on the at least one software package, the first malware scan associated with a first malware scanner and providing a first scan result;
storing the at least one software package in a first database on a first server or a second database on the first server based on the first scan result;
obtaining a download request requesting at least one software package, the download request associated with a requester;
obtaining custom scan requirements based on presets associated with the requester;
performing, based on the custom scan requirements, a second malware scan on the at least one requested software package, the second malware scan associated with a second malware scanner and providing a second scan result;
assigning the at least one software package to at least one of the first database and the second database based on the second scan result;
making the at least one software package available for download from the first server via an application programming interface (API) call in response to the download request;
providing a notification to the requester regarding at least one of the first scan result, second scan result, and a scan history associated with the requested software package;
obtaining at least one updated software package, the at least one updated software package comprising an update associated with at least one previously obtained software package stored in at least one of the first database and second database; and
performing at least one of a first malware scan and a second malware scan on the at least one updated software package, the first malware scan associated with the first malware scanner and providing a first updated scan result, the second malware scan associated with the second malware scanner and providing a second updated scan result.

20. A computing system for anti-malware package management, the computing system comprising:
at least one computing processor; and
memory comprising instructions that, when executed by the at least one computing processor, enable the computing system to:
obtain at least one software package, the at least one software package associated with at least one of free software and open source software;
perform a first malware scan on the at least one software package, the first malware scan associated with a first malware scanner and providing a first scan result;
store the at least one software package in a first database on a first server or a second database on the first server based on the first scan result;
obtain a download request requesting at least one software package, the download request associated with a requester;
obtain custom scan requirements based on presets associated with the requester;
perform, based on the custom scan requirements, a second malware scan on the at least one requested software package, the second malware scan associated with a second malware scanner and providing a second scan result;
assign the at least one software package to at least one of the first database and the second database based on the second scan result;
make the at least one software package available for download from the first server via an application programming interface (API) call in response to the download request;
provide a notification to the requester regarding at least one of the first scan result, second scan result, and a scan history associated with the requested software package;
obtain at least one updated software package, the at least one updated software package comprising an update associated with at least one previously obtained software package stored in at least one of the first database and second database; and
perform at least one of a first malware scan and a second malware scan on the at least one updated software package, the first malware scan associated with the first malware scanner and providing a first updated scan result, the second malware scan associated with the second malware scanner and providing a second updated scan result.

21. A non-transitory computer readable medium comprising instructions that when executed by a processor enable the processor to:
obtain at least one software package, the at least one software package associated with at least one of free software and open source software;
perform a first malware scan on the at least one software package, the first malware scan associated with a first malware scanner and providing a first scan result;
store the at least one software package in a first database on a first server or a second database on the first server based on the first scan result;
obtain a download request requesting at least one software package, the download request associated with a requester;
obtain custom scan requirements based on presets associated with the requester;
perform, based on the custom scan requirements, a second malware scan on the at least one requested software package, the second malware scan associated with a second malware scanner and providing a second scan result;
assign the at least one software package to at least one of the first database and the second database based on the second scan result;

make the at least one software package available for download from the first server via an application programming interface (API) call in response to the download request;

provide a notification to the requester regarding at least one of the first scan result, second scan result, and a scan history associated with the requested software package;

obtain at least one updated software package, the at least one updated software package comprising an update associated with at least one previously obtained software package stored in at least one of the first database and second database; and perform at least one of a first malware scan and a second malware scan on the at least one updated software package, the first malware scan associated with the first malware scanner and providing a first updated scan result, the second malware scan associated with the second malware scanner and providing a second updated scan result.

* * * * *